Patented Nov. 14, 1950

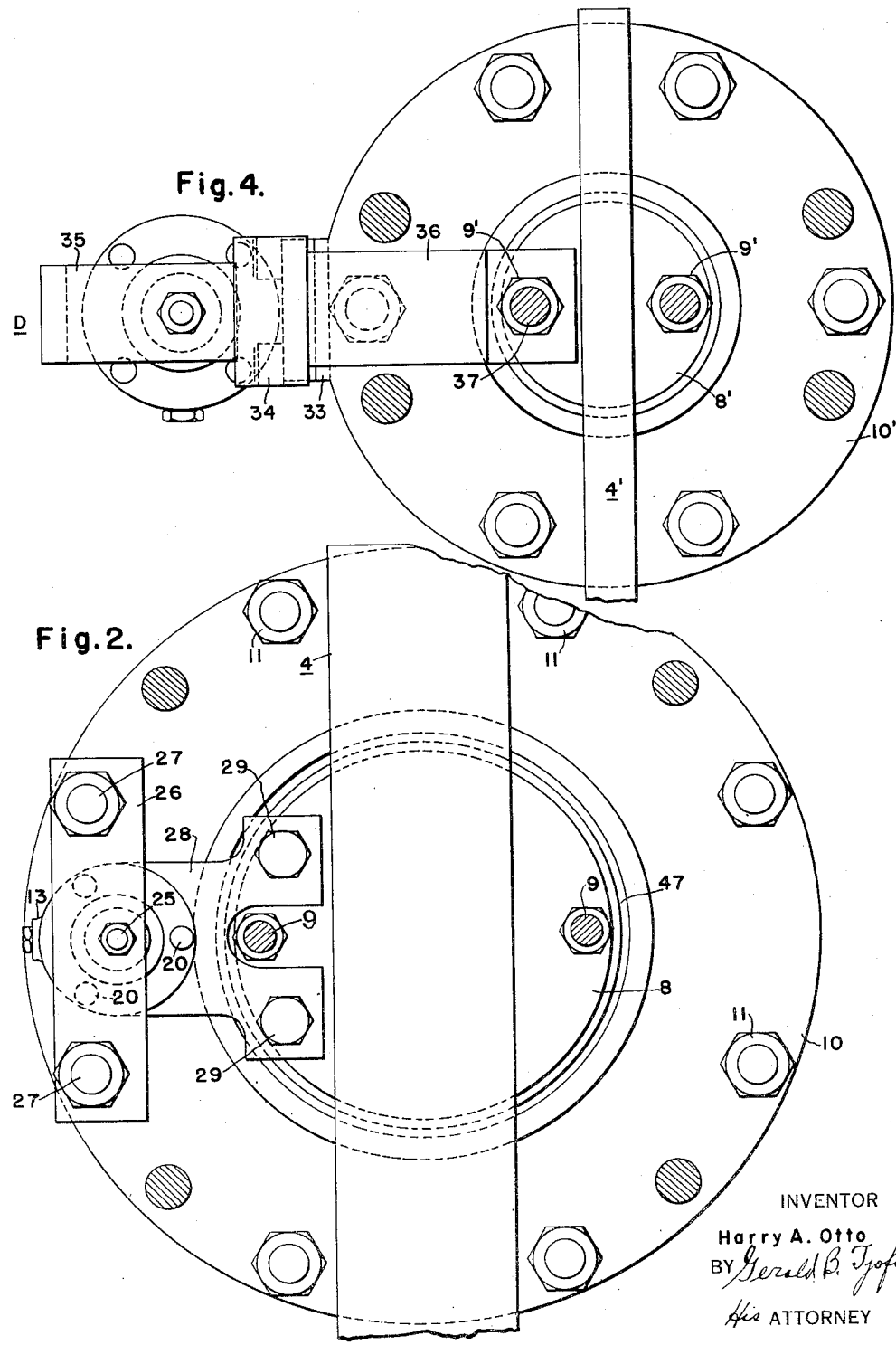

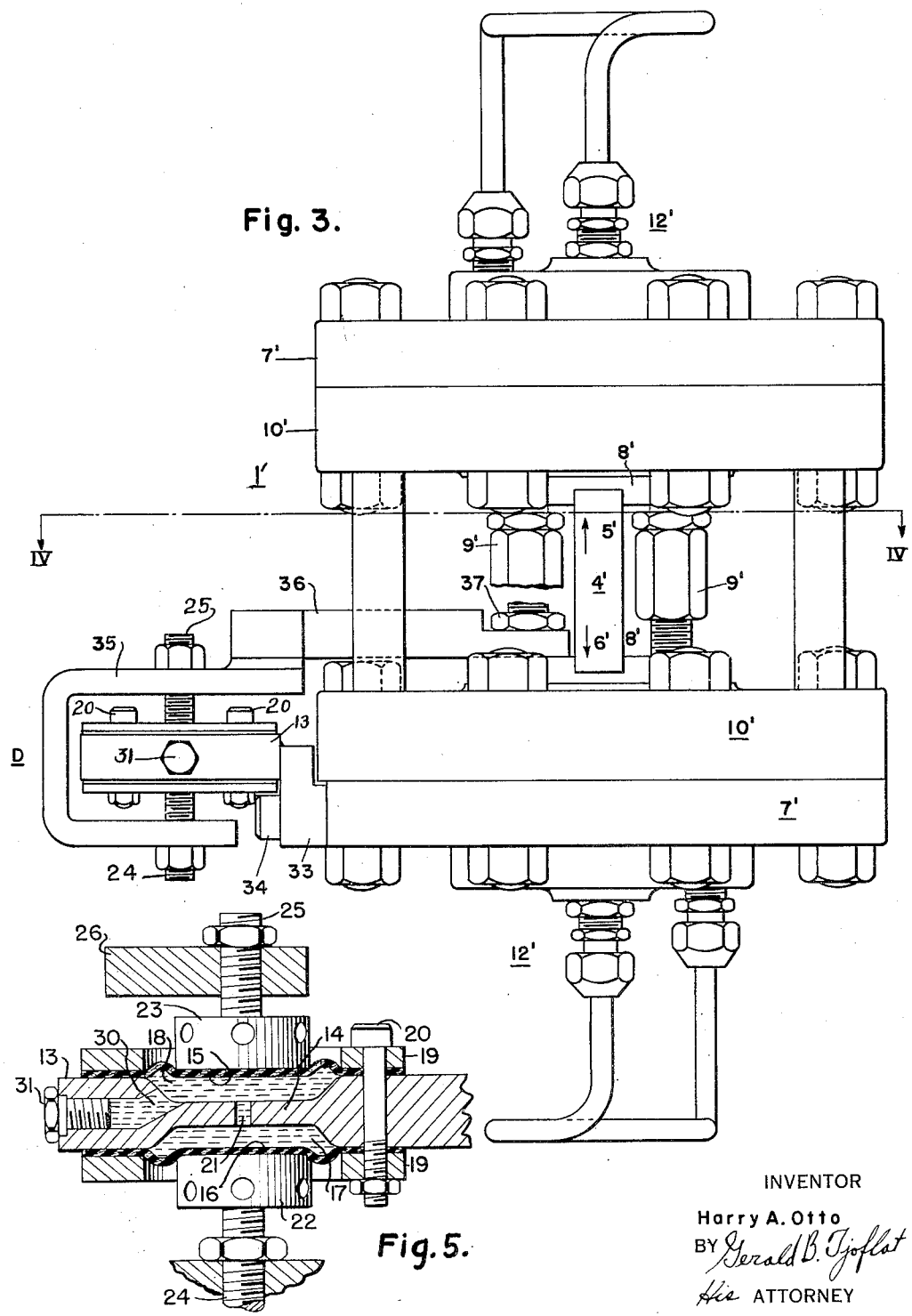

2,529,883

UNITED STATES PATENT OFFICE 2,529,883

VIBRATION DAMPING DEVICE

Harry A. Otto, Pittsburgh, Pa., assignor to Hagan Corporation, Pittsburgh, Pa., a corporation of Pennsylvania Application April 3, 1946, Serial No. 659,346

2 Claims. (Cl. 188—98)

This invention relates to vibration damping devices and more particularly to damping devices of the fluid type.

An object of this invention is to provide a fluid type damping device that is simple in construction, efficient and effective in operation, and readily coupled to the movable element of a device or machine to damp out or eliminate tendencies of such element to vibrate.

Another object of the invention is to provide a damping device of the fluid type which has no moving valve elements, and has a minimum of moving parts.

The above and other objects and advantages of the invention will be apparent to those skilled in this art from the following description taken in conjunction with the accompanying drawings in which:

Fig. 2 is a view in section taken on line II—II of Fig. 1;

Fig. 3 is a view in elevation of a device such as shown in Fig. 1, but illustrating a modified mounting for the damping device;

Fig. 4 is a view in section taken on line IV—IV of Fig. 3; and

Fig. 5 is an enlarged view in section of the damping device as shown in section in Figure 1.

Throughout the drawings and the specification, like reference characters indicate like parts.

Figure 1:
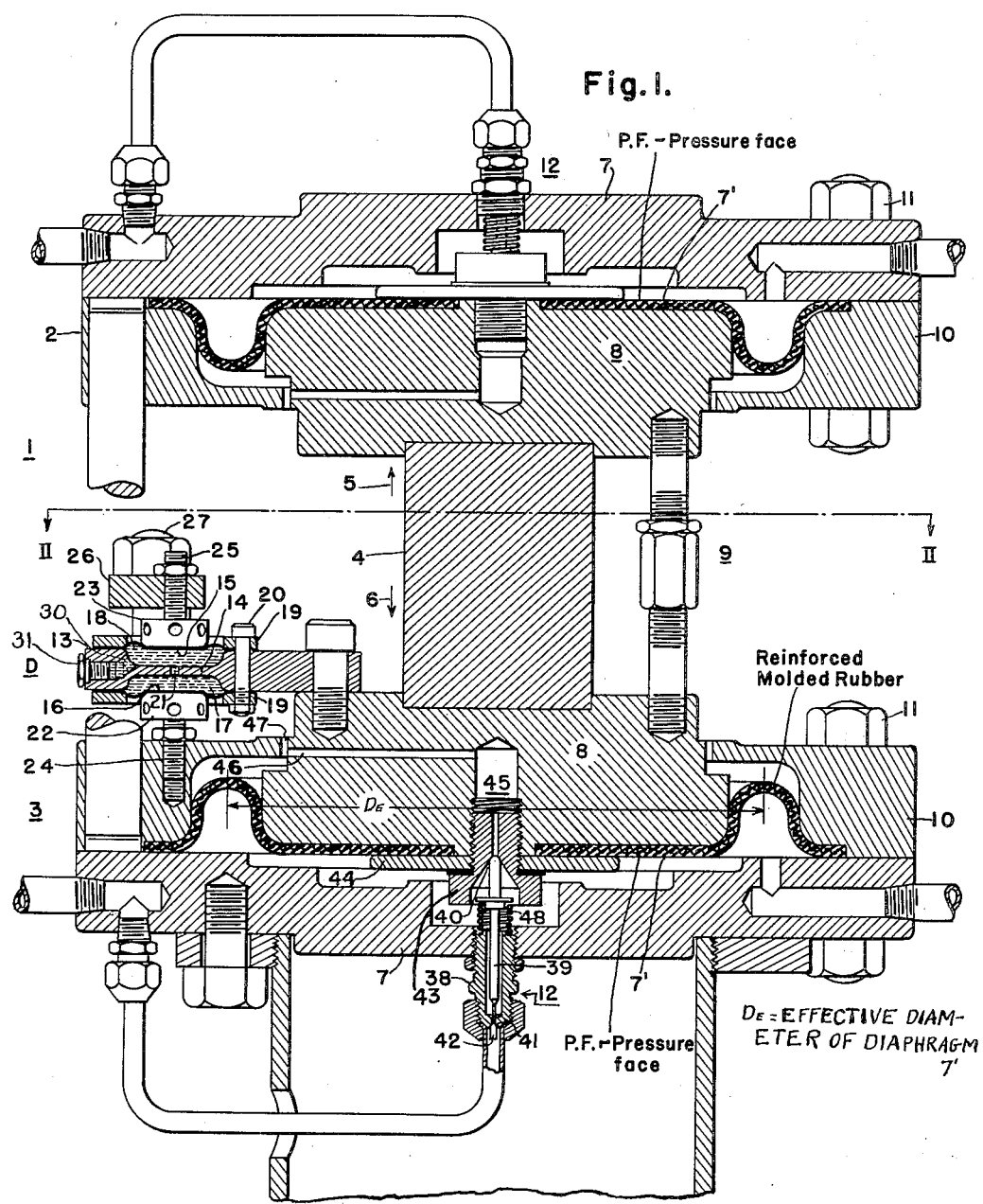
Figure 1 is a view in vertical section of a device whose mechanical system has a tendency to vibrate, which device is provided with a damping device, in accordance with the invention, for damping out or preventing vibration of said system.

In Fig. 1 of the drawings a double acting thrust or force measuring device 1 is shown comprising two similar units 2 and 3 disposed to measure a force or thrust applied to one or the other of them by a force or thrust transmitting member 4, such as the torque arm of a dynamometer (not shown) for example. When the thrust or force is in the direction of arrow 5, it is measured by unit 2, and by unit 3 when acting in the direction of arrow 6.

Each of units 2 and 3 has a housing 7, a diaphragm 7' and a thrust plate 8 secured to its central portion, which thrust plates are clamped to member 4 by means of turn-buckles 9, only one of which is shown in Fig. 1. The marginal edge of each diaphragm is clamped to its housing by means of a clamp ring 10 and bolts 11. Each of units 2 and 3 is also provided with a poppet valve 12 so constructed and so actuated by its associated diaphragm as to maintain on the pressure face P. F. of the respective diaphragms, a pressure of sufficient magnitude to balance the force applied by member 4. The valve and diaphragm of each unit, together with member 4, constitute a vibratory system which, when certain conditions prevail, results in vibration of the system. When vibration develops neither of units 2 or 3 can function properly to accurately measure the thrust force applied to it. In order to render units 2 and 3 non-vibrating and therefore accurate, a damping device D is provided.

Damping device D comprises a hollow member 13 having a partition 14 therein, and flexible members or diaphragms 15 and 16 disposed across the open ends of member 13. Thus, member 13, as shown, has oppositely disposed concavities which are separated by partition 14. These diaphragms, together with partition 14 and said concavities, form closed chambers 17 and 18. The diaphragms may be secured to member 13 by means of clamp rings 19 and bolts 20 in such manner as to form a fluid tight joint with member 13.

Partition 14 is provided with a relatively small opening or orifice 21 and the interior of the hollow member is filled with a suitable fluid. The orifice permits fluid to be displaced from one of chambers 17 and 18 to the other in response to the flexing of one or the other of the diaphragms towards partition 14. Orifice 21 is of such size that when a displacing force is suddenly applied to one or the other of diaphragms 15 and 16, a high resistance to flow of the fluid through the orifice is developed, but when a force is slowly and gradually applied, only slight resistance is developed.

For most applications of the damping device, it is preferred to employ fluids whose viscosities are substantially unaffected by temperature changes. Turpentine is one of these fluids and may be advantageously employed in device D. It is not essential for all applications of device D that the viscosity remain constant with changes in temperature, as reasonably wide variations in viscosity will not materially affect the efficiency of operation of the device in certain applications of the invention.

In the arrangement shown in Fig. 1, deflection of diaphragms 15 and 16 is effected through relative movement of member 13 and bearing members 22 and 23 which bear against diaphragms 15 and 16 respectively. The relative movement required to deflect diaphragms 15 and 16 may be produced by securing member 13 to thrust plate 8 of unit 3 (it could be also secured to the thrust plate of unit 2) so that it is movable with the plate, and securing members 22 and 23 to a stationary part of device 1, to clamp ring 10 of unit 3 for example.

Bearing member 22 may be attached to or made part of a bolt 24 that is threaded into a tapped hole in ring 10. Likewise bearing member 23 may be attached to or made part of a bolt 25 which is threaded through a support plate 26 carried by bolts 27 threaded into ring 10.

The manner in which member 13 may be secured to thrust plate 8 is shown in Fig. 2. Member 13 may be provided with an arm 28 having a bifurcated end shaped to straddle turnbuckle 9, the bifurcated end being secured to the thrust plate with stud bolts 29.

Fluid may be introduced into hollow member 13 through an opening 30 leading to chamber 18, this opening being closed with a screw plug 31 after filling. During the filling operation entrapped air is allowed to escape through an opening (not shown) in member 13 leading to chamber 17 and which after filling is closed with a screw plug like the plug 31.

When the device has been filled with fluid and the bifurcated arm 28 has been secured to thrust plate 8, the bearing members 22 and 23 are adjusted to so bear against the diaphragms 15 and 16 respectively, the slack is taken up in the damping device. It is preferred to so adjust the bearing members that the areas of diaphragms 15 and 16 in contact with the bearing members are pressed inwardly and those portions of the diaphragms between the bearing members and the clamping rings bulge outwardly as shown in Fig. 1. The outwardly bulging portions of the diaphragms constitute slack portions of the diaphragms. These slack portions, and consequently the effective areas of the diaphragms may be adjusted by turning the bolt portions so that the bearing members 22 and 23 are moved towards or away from partition 14.

In Figs. 3 and 4 the damping device D is shown operatively mounted on a device 1' which is like device 1 so far as structure and operation are concerned but is of smaller size. The diaphragm housings of Fig. 3 are smaller as are the diaphragms 7'' and the thrust plates 8'. Since device 1' is smaller, the mountings are modified to suit the space limitations of the device to which damping device D is to be applied. Device D of a given size is effective to damp out vibration over a wide range of sizes of devices such as 1 and 1'.

As shown in Fig. 3, the bifurcated arm 28 shown in Fig. 1 is omitted and a flange 33 substituted. This flange is suitably secured to member 13 and is bolted to clamp ring 10 with bolts 34. Thus member 13 is stationary with respect to the movable and vibratable member 8'. The bolts 24 and 25 of bearing members 22 and 23 (not shown in Fig. 3) are adjustably threaded into a U-shaped support 35. Support 35 is provided with an arm 36 the inner end of which is bolted to thrust plate 8', by means of the lower bolt of turnbuckle 9' and a nut 37.

With this arrangement, member 13 with its diaphragms 15 and 16 are stationary relative to the vibratable member, and the bearing members 22 and 23 and the vibratable member 8' and are movable relative to member 13.

Valves 12 and 12' as illustrated are of the same construction therefore the sectional view of this valve as shown in Fig. 1 and a description of that view will be sufficient.

The valve comprises a valve body 38, a valve stem 39, and a movable valve seat 40. Body 38 is threaded into the housing 7 at the center thereof, i. e., at a place coinciding with the center of diaphragm 7'. The outer end of the valve body is formed with a valve seat 41 which is opened or closed by a valve 42 carried by the outer end of stem 39. The inner end of the valve stem coacts with the valve seat 40. Valve seat 40 is formed in the head of a bolt 43 which also acts to clamp the middle portion of diaphragm 7' between a backing plate 44 and thrust member 8. Seat 40 acts as an exhaust port and provides communication between the pressure chamber, i. e., the space between diaphragm 7' and housing 7, and the atmosphere via passages 45, 46 and the space 47 between member 8 and clamp ring 10.

Valve seat 41 is the inlet of the valve and is adapted to be connected to a source of supply of fluid pressure, such as compressed air at constant pressure. The valve stem may be urged towards the position of closing inlet port 41 by means of a light compression spring 48.

When the force imposed on the thrust plate 8 by member 4 increases to a value sufficient to deflect diaphragm 7' in a direction to open inlet port 41 (the exhaust port 40 being closed) fluid pressure is admitted to the pressure chamber until the force exerted by the pressure in the diaphragm balances the force applied by member 4. When this occurs the diaphragm is in neutral position and both valve ports (inlet and outlet) are closed. If the force applied by member 4 decreases the force exerted by the pressure is greater, thereby causing diaphragm 7' to deflect in a direction in which exhaust seat 40 moves away from valve stem 39 (the inlet port remaining closed) and pressure fluid is exhausted to atmosphere until the force of the pressure in the pressure chamber is reduced to a value at which it balances the force applied by member 4. When balance is established, the diaphragm 7' is in neutral position and both the inlet and exhaust ports of valve 12 are closed. Thus, a pressure is established and maintained in the pressure chamber which is required to balance whatever force is applied by member 4 within the limits of the force balancing capacity of device 1.

A system such as is represented by diaphragm 7' and valve 12 has a tendency to vibrate. This tendency is probably attributable to the fact that only a small or short travel of valve 10 is required in one direction or the other from neutral to increase or decrease the pressure acting on diaphragm. Thus under certain conditions which created in the system a tendency to vibrate, this tendency is aggravated as the amplitude of the unstable travel of valve stem 39 increases. Damping device D being coupled to the vibratory system counteracts these vibrations and stabilizes the system. The damping device does not interfere with normal movements of diaphragm 7' but does check movement resulting from vibration and sudden large scale deflection of the diaphragm. The energy involved in vibration is dissipated in the fluid of device D by being forced in one direction or the other through the orifice in partition 14 resulting from deflection of diaphragms 15 and 16 thereof.

Having thus described the invention, what I claim as new and desire to secure by Letters Patent is:

I claim:

1. A vibration damping device comprising a rigid member having concavities in its opposite faces, said concavities being separated by a wall integral with said rigid member, said wall having a restricted passageway providing communication between said concavities, a diaphragm extending across each concavity, said diaphragms being secured by their marginal edges in fluid-tight relationship to said rigid member whereby each concavity with its diaphragm forms a fluid-tight chamber, a rigidly supported bearing member pressing on each diaphragm in a direction inwardly of its associated concavity, the area of contact of said bearing members with their respective diaphragms being less than the area of the respective diaphragms that is included within the secured marginal edges thereof so as to provide annular slack portions between said bearing members and said marginal edges, means for independently adjusting said bearing members in a direction towards or away from said wall whereby the slack portions and consequently the effective areas of said diaphragms may be adjusted when said chambers are filled with a fluid, the spacing between said bearing members being fixed for each adjusted position thereof, a fluid filling said chambers to such extent that air is excluded therefrom and the diaphragms are at all times in contact with said fluid, whereby relative movement between said rigid member and said bearing members causes one or the other of said diaphragms to be pressed in a direction into its associated concavity and the other diaphragm is pressed outwardly of its associated concavity by the displacement of fluid through said restricted passageway, and means for so connecting said vibration damping device to a vibratable member that relative movement between said rigid bearing members and said rigid concavitied member is effected in response to vibration of said vibratable member.

2. A vibration damping device comprising a rigid member having cavities on its opposite faces, a rigid partition in said member separating said cavities, said partition having a restricted aperture therein, a diaphragm disposed across each of said cavities, means for securing and clamping the marginal edges of said diaphragms to the respective faces of said rigid member whereby fluid-tight chambers are formed by said diaphragms and cavities that communicate with each other through said aperture, means in said rigid member for filling said chambers with a fluid, a bearing member for each diaphragm abutting the central portion thereof thereby providing an annular slack portion between clamped marginal edges of each diaphragm and its bearing member, a support for said bearing members disposed to maintain the distance between their diaphragm engaging surfaces constant, said support being of U-shape, the rigid member being disposed between the sides of said U-shaped member with the diaphragms in spaced relation thereto, each bearing member being provided with a threaded bolt portion having threaded engagement with the respective sides of the said U-shaped member, said threaded bolt portions being individually adjustable whereby the slack portions and consequently the effective areas of said diaphragms may be adjusted, said U-shaped support and said rigid member being adapted to be coupled respectively to members which tend to vibrate relative to one another whereby relative movement between said U-shaped support and rigid member causes said diaphragms to deflect simultaneously with respect to said partition, one diaphragm moving toward and the other away from the partition and displacing fluid from one chamber to the other through said orifice.

HARRY A. OTTO.

REFERENCES CITED

The following references are of record in the file of this patent:

UNITED STATES PATENTS

| Number | Name | Date |
|---|---|---|
| 1,304,311 | Heldrich | May 20, 1919 |
| 2,317,028 | Chappell et al. | Apr. 20, 1943 |
| 2,361,575 | Thompson | Oct. 31, 1944 |

FOREIGN PATENTS

| Number | Country | Date |
|---|---|---|
| 642,711 | France | May 6, 1928 |